United States Patent
Schaaf et al.

[19]

[11] Patent Number: 6,056,879
[45] Date of Patent: May 2, 2000

[54] MOVABLE MAGNETIC ASSEMBLY FOR COLLECTING AND RELEASING MAGNETIC MATERIALS AND METHOD

[75] Inventors: William R. Schaaf, Taylors; Ray R. Arel, Anderson; Donald L. Smith, Greenville, all of S.C.

[73] Assignee: Insul-Magnetics, Incorporated, Taylors, S.C.

[21] Appl. No.: 09/046,756

[22] Filed: Mar. 24, 1998

[51] Int. Cl.[7] .................................................. B01D 35/06
[52] U.S. Cl. ........................................ 210/695; 209/223.2
[58] Field of Search .................................... 210/222, 400, 210/401, 695; 209/39, 904, 223.2; 198/350, 472, 494, 495, 690.1, 803.6, 417.1, 474.1, 867.04

[56] References Cited

U.S. PATENT DOCUMENTS 2,642,994   6/1953   Casson .
4,457,838   7/1984   Carr .
4,544,060   10/1985  Enomoto .
5,470,466   11/1995  Schaaf ...................................... 210/222

Primary Examiner—W. L. Walker
Assistant Examiner—Marianne Ocampo
Attorney, Agent, or Firm—Ralph Bailey, P.A.

[57] ABSTRACT

An assembly and method for collecting and releasing magnetic materials includes an elongated permanent magnet (A) within an elongated cover (B) constructed from non-magnetic material for providing a collection area for the magnetic materials thereon opposite the magnet. Apparatus (C) separates the magnet to a more remote position in relation to the collection area for releasing magnetic materials from the elongated cover. The magnet and the cover may be moved while in superposed closely adjacent relation for collecting magnetic material and thereafter separated for releasing magnetic material collected on the cover. A driven conveyor (D) may be included in the assembly for transporting the magnet and the cover through a coolant liquid containing magnetic materials in the form of particulate matter formed during a machining operation.

2 Claims, 1 Drawing Sheet

MOVABLE MAGNETIC ASSEMBLY FOR COLLECTING AND RELEASING MAGNETIC MATERIALS AND METHOD

BACKGROUND OF THE INVENTION

This invention relates to the removal of magnetic material especially particles from a liquid coolant used in a machining operation.

U.S. Pat. No. 5,470,466 is illustrative of the prior art wherein a grinder is described by way of illustration. In the business of machining metal parts the coolant may be circulated from a relatively larger tank or a number of machine tools may be supplied from a single tank making it desirable to provide an automatic moving system for continuously removing and collecting magnetic material. Moreover, U.S. Pat. No. 5,470,466 utilizes elongated permanent magnets constructed of magnetized segments. These elongated magnets are contained within elongated aligned covers of non-magnetic material from which the magnets must be withdrawn axially for releasing the magnetic material collected thereon.

While the invention is described in the context of extracting magnetic particles from coolant fluid it is to be understood that the invention may be utilized for any other purpose as where extraction or collection of magnetic particles is desired such as sweepers for collecting magnetic particles.

SUMMARY OF THE INVENTION

Accordingly, it is an important object of the present invention to provide a magnetic collection apparatus wherein an elongated primer magnet is movable within a cover constructed of non-metallic material so as to separate laterally from a collection area provided on a surface carried by the cover. When the magnet is moved laterally the magnetic materials are released from the collection area or surface provided the magnet is removed from such proximity as to retain its attractive force over the magnetic particles to the extent that release of the particles is prevented.

Another important object of the invention is the provision of a conveyor operated system for transporting elongated bar magnets contained in liquid-proof covers constructed of non-metallic material. Movement of the magnet within the cover may be achieved through the actuation of a handle or other suitable form of linkage or the cover may utilize a lateral passageway for containing the bar magnet arranged in such as a way to prevent tilting of the cover causing the bar magnet to be laterally transposed within the casing preventing the lateral material from the liquid of the material or other medium which it is utilized.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2-A is a transverse front elevation of a lower portion of the assembly shown in FIG. 2 with parts broken away illustrating the transverse disposition of the magnets and cover assemblies in relation to the conveyor and tank containing coolant liquid.

DESCRIPTION OF THE PREFERRED EMBODIMENT

The drawings illustrate an assembly and method for collecting and releasing magnetic materials including an elongated permanent magnet A. An elongated cover B is constructed from non-magnetic material in substantial alignment in a position closely adjacent to the magnet generally in superposed relation therewith to provide a collection area for the magnetic materials thereon opposite the magnet. Apparatus C is provided for separating the magnet to a more remote position in relation to the collection area of the elongated cover while maintaining a generally superposed relationship therebetween for releasing magnetic materials from the elongated cover. The magnet and the cover may be moved while in superposed closely adjacent relation for collecting magnetic material and thereafter separated for releasing magnetic material collected on the cover. A driven conveyor D may be included in the assembly for transporting the magnet and the cover through a coolant liquid containing magnetic materials in the form of particulate matter formed during a machining operation.

Figure 1:
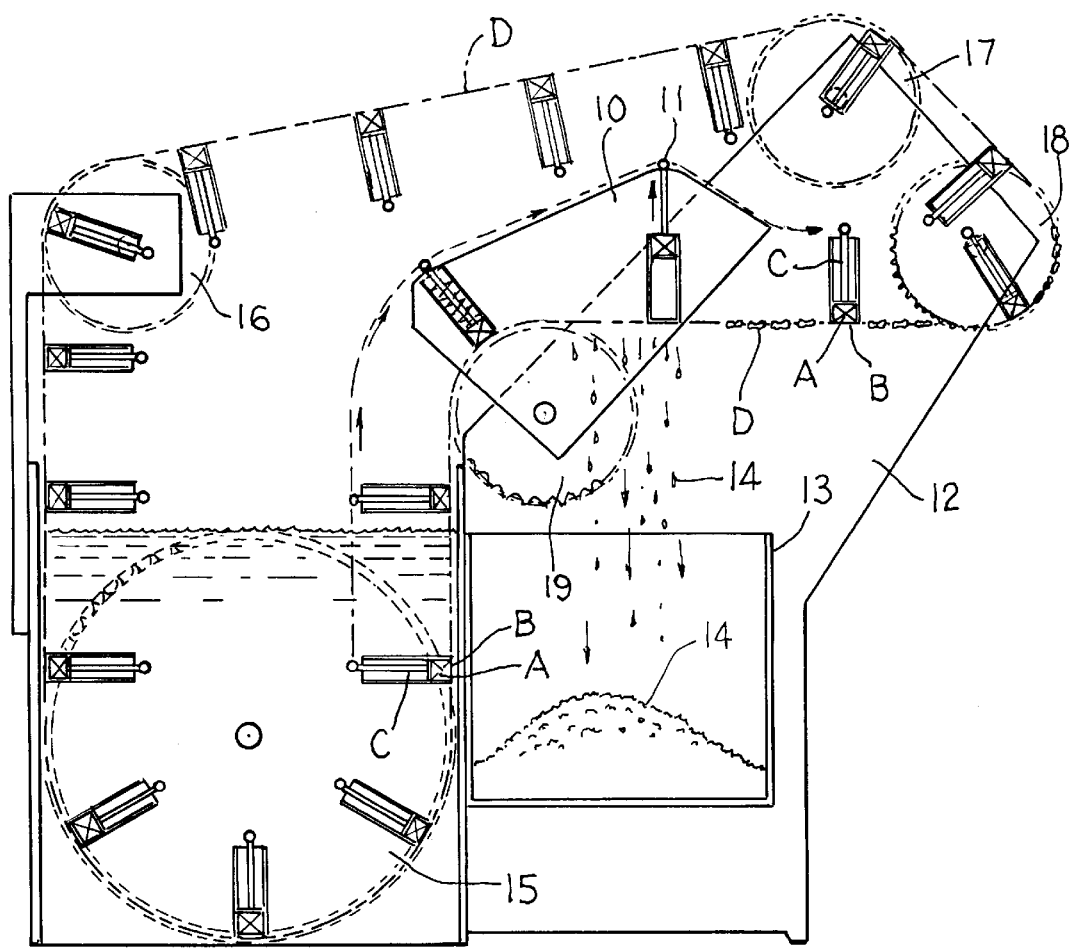
FIG. 1 is a schematic side elevation looking toward the right side of the apparatus which provides a conveyor for moving the magnets enclosed within the non-magnetic covers in a generally clockwise direction in FIG. 1.
Figure 2:
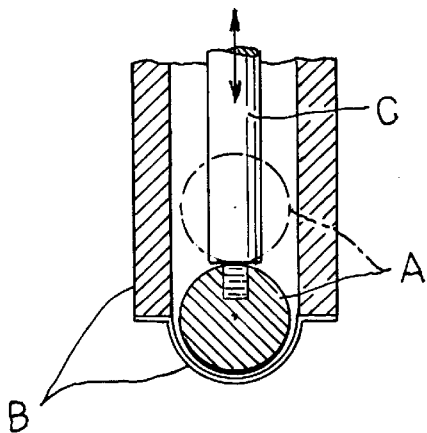
FIG. 2 is an enlarged sectional elevation of a cover and magnet assembly as illustrated in FIG. 1 looking toward a right-hand end of the assembly.
Figure 2A:
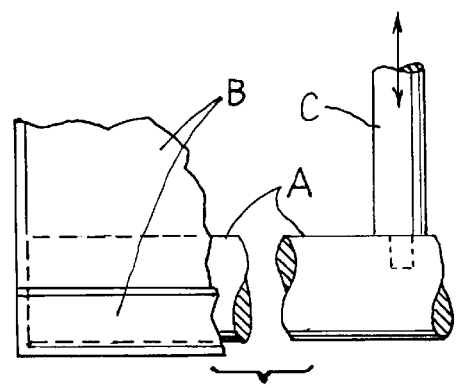

FIGS. 1, 2 and 2-A illustrate an assembly consisting of the elongated permanent magnet A carried within a substantially vertical cover B. A link C is operated by a cam 10 over which a transverse handle 11 passes and which acts as a cam follower. The cam 10 is illustrated as being carried by a suitable frame 12 which extends forwardly in FIG. 1 over a collection box 13. The magnetic particles 14 are collected in a pile within the box for recycling or discarding. It is an important advantage of the invention to avoid the use of filler paper and to permit extended use of the coolant fluid while avoiding contamination as the particles may be removed from the coolant fluid facilitating disposal of the fluid. The conveyor in FIG. 1 moves in a generally clockwise direction as is designated by the arrows, the conveyor includes endless chains adjacent to each side of the elongated frame 12 passing beneath the large sprocket 15 and thence over sprockets 16, 17 and 18 before passing over sprocket 19 and thence over the cam 10 for release of the particles by virtue of the magnet A be moved upwardly beneath the cover B by engagement with the handle 11.

It is thus seen that a versatile assembly has been provided wherein magnets are mounted within an elongated cover constructed of non-magnetic material. The magnets may be laterally and rectilinearly moved away from the collection areas from magnetic materials permitting release thereof for collection and disposal.

While a preferred embodiment of the invention has been described using specific terms, such description is for illustrative purposes only, and it is to be understood that changes and variations may be made without departing from the spirit or scope of the following claims.

What is claimed is:

1. A method for collecting and releasing magnetic materials from coolant liquid utilized in a machining operation comprising the steps of:

mounting elongated covers constructed of non-magnetic material on a conveyor for transport through a tank containing said coolant fluid;

positioning elongated permanent magnets in transverse alignment with and in a position closely adjacent to the elongated covers;

moving the conveyor and the magnets within the covers through the liquid for collecting magnetic material on the covers;

separating the magnets from the magnetic material collected on the elongated covers while maintaining a generally superposed relation therebetween for releasing magnetic materials from the elongated covers by mechanically imparting transitory motion in respect thereto through linkage connected to the magnets; and collecting magnetic material released from the covers.

2. The method set forth in claim 1 wherein said transitory motion is rectilinear.

* * * * *